United States Patent [19]
McClellan

[11] Patent Number: 6,018,873
[45] Date of Patent: Feb. 1, 2000

[54] WIRE STRIPPER DEVICE

[76] Inventor: Ralph McClellan, 95 Upper Lakeview Ave., Ringwood, N.J. 07456

[21] Appl. No.: 09/143,117

[22] Filed: Aug. 28, 1998

[51] Int. Cl.[7] .................................................. B21F 13/00
[52] U.S. Cl. ................................. 30/90.4; 30/90.1; 81/9.4
[58] Field of Search .................................... 30/90.1, 90.4, 30/278, 289; 81/9.4

[56] References Cited

U.S. PATENT DOCUMENTS

| | | |
|---|---|---|
| 843,353 | 2/1907 | McKenna . |
| 1,866,095 | 7/1932 | Foley . |
| 2,437,514 | 3/1948 | Givens . |
| 2,662,283 | 12/1953 | Gienger . |
| 2,761,211 | 6/1956 | Grant . |
| 2,830,366 | 4/1958 | Chisena . |
| 2,995,052 | 8/1961 | Funcik . |
| 3,057,232 | 10/1962 | Cornell, Jr. . |
| 3,869,791 | 3/1975 | Horrocks ................... 30/90.1 |
| 4,179,956 | 12/1979 | Gooley . |
| 4,792,581 | 12/1988 | McCollum et al. ........ 30/90.1 |
| 4,953,293 | 9/1990 | Sterlacci ..................... 30/90.1 |
| 5,050,302 | 9/1991 | Mills ........................... 30/90.4 |
| 5,093,992 | 3/1992 | Temple, Jr. et al. ....... 30/90.4 |
| 5,105,542 | 4/1992 | Nakajima ................... 30/90.1 |
| 5,140,751 | 8/1992 | Faust .......................... 30/90.4 |
| 5,822,863 | 10/1998 | Ott .............................. 30/90.4 |

*Primary Examiner*—Hwei-Siu Payer

[57] ABSTRACT

A wire stripper device for stripping insulation from a wire includes a plurality of replacable wire guide inserts for supporting and stripping wire of different sizes. An indented guide surface and a slot are formed in the wire guide insert which permit the user to remove and replace the insert without adjusting the knife.

18 Claims, 3 Drawing Sheets

WIRE STRIPPER DEVICE

BACKGROUND OF THE INVENTION

This invention relates to a portable wire stripper device for use by electricians and, more particularly, to a tool that will cut a sheath of cable and strip insulation from wires having different diameters.

Wire strippers used in the field to cut insulation from wire are well known. Prior art examples of tools for stripping insulation from wires are disclosed in U.S. Pat. Nos:

| | | | | |
|---|---|---|---|---|
| 843,353 | 1,866,095 | 2,437,514 | 2,662,283 | 2,761,211 |
| 2,830,366 | 2,995,052 | 3,057,232 | 3,869,791 | 4,179,956 |
| 4,953,293 | 5,093,992 | 5,105,542. | | |

There remains, however, a need for an improved wire stripping tool designed to remove insulation from many different types of wire of ranging diameters.

The resale profits made form reselling recycled copper and metal cable wire have risen incredibly over the last 20 years. The problem with resale of cable is that the insulation must be removed by a machine or cut with a blade. Until this time, a tool for quickly stripping insulation from cable wire has not been invented. There exists a need for a portable tool system that can be used to quickly strip insulation from any sized cable or wire.

SUMMARY OF THE INVENTION

In response to the problem described in the Background of the Invention, a first object of the present invention is to obtain a tool for removing insulation from wire in the field without causing damage to the wire, at low cost, with an easily exchangeable wire guide insert for handling wires of different diameter without changing or removing the blade.

Further, the second object of the present invention is to realize a wire stripper system for removing the insulation from different wires of different diameters by changing wire guide inserts, each wire guide insert having a bore diameter which corresponds to the size of the wire.

It is still another object of the present invention to provide a portable wire stripping tool having a solid housing block for supporting and stripping insulation from a wire.

Another object of the present invention is to provide a wire stripper made of removable and replaceable working parts.

DETAILED DESCRIPTION OF THE INVENTION

Figure 3:
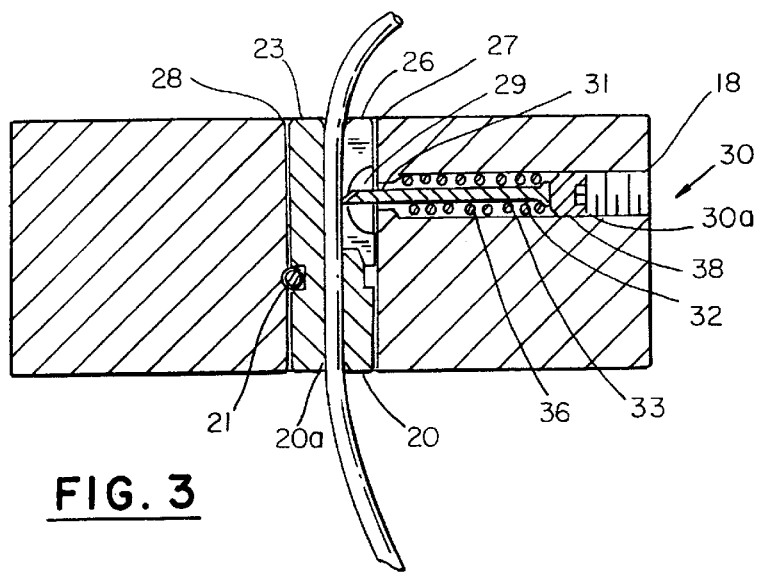
FIG. 3 illustrates a cross sectional view of the wire stripper.
Figure 1:
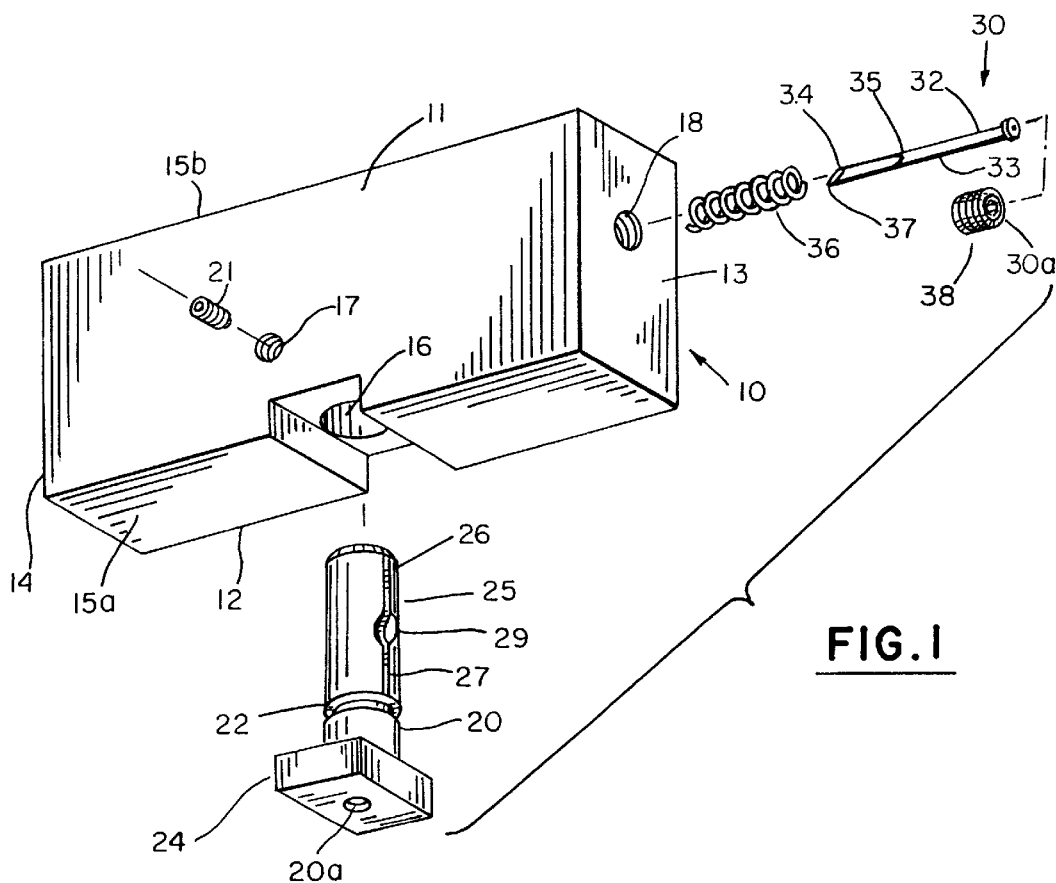
FIG. 1 illustrates an exploded view of a wire stripper made in accordance with the invention.
Figure 2A:
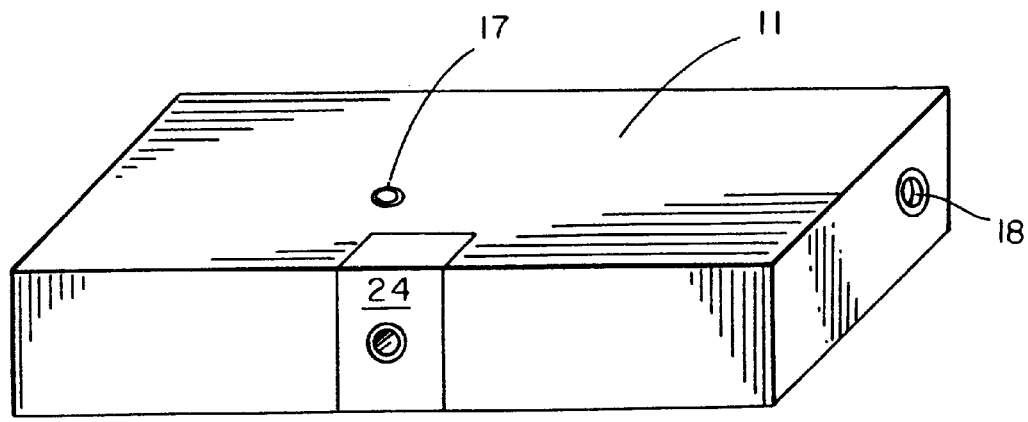
FIG. 2a illustrates a plan view of the wire stripper.
Figure 2B:
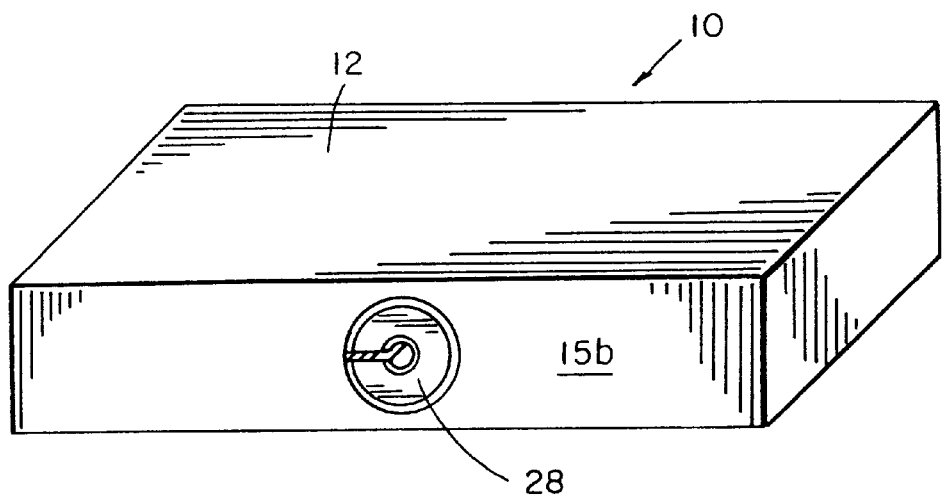
FIG. 2b illustrates a plan view of the wire stripper.

The wire stripper of the present invention consists of a block housing 10. The housing can be made of aluminum, plastic, steel or any other comparable material. As shown in FIGS. 1–3, the housing is made of machined aluminum in the form of a rectangular block. The housing has a top surface 11, a bottom surface 12, a first end surface 13, a second end surface 14, a front side surface 15a, a back side surface 15b, a wire guide insert channel 16, a threaded set screw channel 17 and a threaded knife guide channel 18.

As further shown in FIGS. 1–3, a wire guide insert 20 is positioned in the wire guide insert channel 16 and has a wire guide bore 20a. The wire guide insert 20 is secured or locked in place by a set screw 21 which is threaded into the set screw channel 17 through the top surface 11 until reaching a groove 22 formed in the insert 20. The insert 20 has a body 23 with a rectangular shaped first end 24, a cylindrical extension 25 which ends at groove 22 and a slotted rear end 26 which extends through the back side surface 15b. The insert 20 extends from the first side surface 15a to the back side surface 15b. A slot 27 is formed in the cylindrical extension 25 and extends or runs longitudinal from rear end 28 of the cylindrical extension 25 to groove 22. Centered in the slot 27 is a tapered indented guide surface 29. The tapered indented guide surface 29 and the slot 27 form an opening in the wire guide insert 20 from the groove 22 to the rear end 28 of the cylindrical extension 25.

Adjustably positioned in the threaded knife guide channel 18 is a knife assembly 30. The knife assembly 30 includes knife 31 including an elongated knife bar 32 having a cylindrical section 33 and a tapered flat cutting section 34. A threaded adjusting nut 30a is positioned in knife guide channel 18 for adjusting the depth of knife bar 32. The cylindrical section 33 has a stop portion 35. Mounted on the cylindrical section 33 is a coiled spring 36 which serves to bias the knife bar 32 toward the wire guide bore 20a. The knife bar 32 has a pointed tip 37 which serves to pierce the insulation of the wire upon impact. The tapered flat cutting section 34 is of a thickness lesser than the thickness of the slot 27 and extends into the indented guide surface 29 and through the slot 27 into the wire guide bore 20a. The knife 31 is adjustable by adjusting set screw 38.

In order to assemble the wire stripping device, the knife assembly 30 is secured in the housing 10 and the insert 20 is slid into the wire guide insert channel 16. Until the insert 20 is fully positioned within the wire guide insert channel 16. The set screw 21 is next adjusted to lock the insert 20 in place. The knife 31, can then be adjusted to cut the insulation at a desired depth by turning the threaded adjusting screw 38.

Figure 4A:
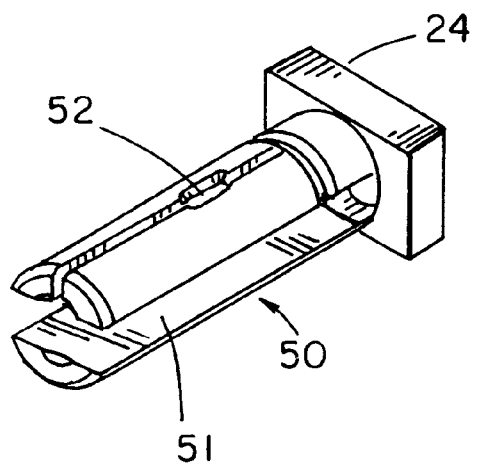
FIGS. 4a–4c illustrate alternative inserts which may be used with the wire stripper.
Figure 4B:
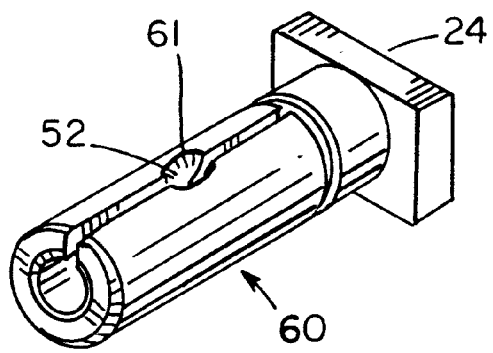
Figure 4C:
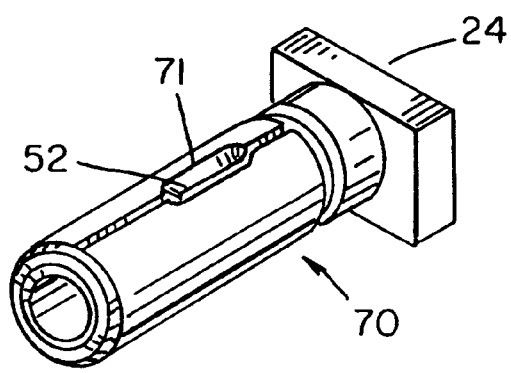

Illustrated in FIGS. 4a, 4b and 4c are replaceable inserts used for stripping different sized cable. Each insert shown in the drawings is part of a portable field assembly carried by an electrician in the field and each is replaceably mountable in housing 10 depending on the particular size of the wire.

Insert 50 shown in FIG. 4a has a wide gap 51 in cylindrical housing for handling all types of flat cable. Indented guide surface 52 is the same size as that provided in the first embodiment.

FIG. 4b illustrates an inset 60 for stripping small cable and has a rounded indented guide surface 61.

Insert 70 shown in FIG. 4c has a long indented guide surface 71. With each insert change different sizes of knives may be used depending on the size of the wire.

I claim:

1. A wire stripper device for stripping insulation from a wire comprising:

a housing, said housing having a top surface, a bottom surface, a first end surface, a second end surface, a front side surface, a back side surface, a wire guide insert channel, a threaded set screw channel, a threaded knife guide channel;

a wire guide insert positioned in said wire guide insert channel and extending from said front side surface to said back side surface, said wire guide insert having a wire guide bore which extends from said front side surface to said back side surface, said wire guide insert having a first leg and a second leg, said second leg having a slot which extends longitudinally from a back end of said second leg to a groove on said second leg, said second leg having an indented guide surface postioned along said slot;

a knife assembly, said knife assembly having an elongated knife bar, said elongated knife bar having a cylindrical section and a tapered flat cutting section, said cylindrical section having a stop portion, a coiled spring mounted on said cylindrical section and a threaded adjusting nut for adjusting the depth of said knife bar, said knife bar adjustably mounted in said threaded knife guide channel, said knife bar extending into said indented guide surface and through said slot into said wire guide bore, said tapered flat cutting section having a thickness which is less than said slot so said wire insert can be removed from said housing without retracting said knife bar.

2. A wire stripper device as recited in claim 1, wherein said knife assembly in mounted through said first end surface.

3. A wire stripper device as recited in claim 1, wherein said housing is made of aluminum.

4. A wire stripper device as recited in claim 1, wherein said housing formed from a solid block of machined aluminum.

5. A wire stripper device as recited in claim 1, wherein said wire guide insert is repaceable with one of a plurality of inserts, each insert having a bore of a different diameter.

6. A wire stripper device as recited in claim 1, wherein said housing includes a set screw for securing said insert in said housing.

7. A wire stripper device for stripping insulation from a wire comprising:

a housing, said housing having a front side surface, a back side surface, a wire guide insert channel and a threaded knife guide channel;

a wire guide insert positioned in said wire guide insert channel and extending form said front side surface to said back side surface, said wire guide insert having a wire guide bore which extends from said front side surface to said back side surface, said wire guide having insert a first leg and a second leg, said second leg having a slot which extends longitudinally from a back end of said second leg to a groove location on said second leg, said second leg having an indented guide surface positioned along an outside surface of said second leg along said slot; and, a knife assembly, said knife assembly having an elongated knife, said elongated knife having a cylindrical section and a tapered flat cutting section and a threaded adjusting nut for adjusting the depth of said knife, said knife assembly adjustably mounted in said threaded knife guide channel, said knife extending into said indented guide surface and through said slot into said wire guide bore, said tapered flat cutting section having a thickness which is less than said slot so said wire insert can be removed from said housing without retracting said knife.

8. A wire stripper device as recited in claim 7, wherein said knife has a pointed end.

9. A wire stripper device as recited in claim 7, wherein said knife assembly in mounted through a first end surface of said housing.

10. A wire stripper device as recited in claim 7, wherein said housing is made of aluminum.

11. A wire stripper device as recited in claim 7, wherein said housing formed from a solid block of machined aluminum.

12. A wire stripper device as recited in claim 7, wherein said wire guide insert is repaceable with one of a plurality of inserts, each insert having a bore of a different diameter.

13. A wire stripper device as recited in claim 7, wherein said housing includes a set screw for securing said insert in said housing.

14. A wire stripper device for stripping insulation from a wire comprising:

a housing, said housing having a top surface, a bottom surface, a first end surface, a second end surface, a front side surface, a back side surface, a wire guide insert channel, a threaded set screw channel, a threaded knife guide channel;

a wire guide insert positioned in said wire guide insert channel and extending from said front side surface to said back side surface, said wire guide insert having a wire guide bore which extends from said front side surface to said back side surface, said wire guide insert having a slot and an indented guide surface postioned on said slot;

a knife assembly, said knife assembly having an elongated knife bar, said elongated knife bar having a cylindrical section and a tapered flat cutting section, said cylindrical section having a stop portion, a coiled spring mounted on said cylindrical section and a threaded adjusting nut for adjusting the depth of said knife bar, said knife bar adjustably mounted in said threaded knife guide channel, said knife bar extending into said indented guide surface and through said slot into said wire guide bore, said tapered flat cutting section having a thickness which is less than said slot so said wire insert can be removed from said housing without retracting said knife bar and a set screw threadably positioned in said threaded set screw channel and threaded into said groove for locking said insert in said housing.

15. A wire stripper device as recited in claim 14, wherein said knife assembly in mounted through said first end surface.

16. A wire stripper device as recited in claim 14, wherein said housing is made of aluminum.

17. A wire stripper device as recited in claim 14, wherein said housing formed from a solid block of machined aluminum.

18. A wire stripper device as recited in claim 14, wherein said wire guide insert is repaceable with one of a plurality of inserts, each insert having a bore of a different diameter.

* * * * *